(12) United States Patent
Tajima

(10) Patent No.: US 10,410,199 B2
(45) Date of Patent: Sep. 10, 2019

(54) PRINT CONTROL SYSTEM AND PRINT CONTROL METHOD

(71) Applicant: Seiko Epson Corporation, Tokyo (JP)

(72) Inventor: Shigeo Tajima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 811 days.

(21) Appl. No.: 14/554,514

(22) Filed: Nov. 26, 2014

(65) Prior Publication Data

US 2015/0154582 A1  Jun. 4, 2015

(30) Foreign Application Priority Data

Nov. 29, 2013  (JP) ................................ 2013-247390

(51) Int. Cl.
  *G06Q 20/20*  (2012.01)
  *G06Q 30/06*  (2012.01)
  *G07F 17/42*  (2006.01)

(52) U.S. Cl.
  CPC ........... *G06Q 20/209* (2013.01); *G06Q 20/20* (2013.01); *G06Q 20/202* (2013.01); *G06Q 20/208* (2013.01); *G06Q 30/06* (2013.01); *G07F 17/42* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 9,335,958 B2* | 5/2016 | Anno | ..................... | G06F 3/1236 |
| 2006/0120786 A1* | 6/2006 | Hisatomi | .............. | G06F 3/1204 |
| | | | | 400/62 |
| 2006/0253392 A1* | 11/2006 | Davies | ................... | G06Q 20/04 |
| | | | | 705/40 |
| 2011/0058208 A1* | 3/2011 | Takahashi | ............. | G06F 3/1222 |
| | | | | 358/1.14 |
| 2012/0059875 A1* | 3/2012 | Clark | ...................... | H04L 67/14 |
| | | | | 709/203 |
| 2012/0133974 A1* | 5/2012 | Nakamura | ............ | G06F 3/1212 |
| | | | | 358/1.15 |

FOREIGN PATENT DOCUMENTS

| JP | 2005-110143 A | 4/2005 |
|---|---|---|
| JP | 2011-108097 A | 6/2011 |
| JP | 2013-250802 A | 12/2013 |

* cited by examiner

*Primary Examiner* — Hajime Rojas

(74) *Attorney, Agent, or Firm* — Workman Nydegger

(57) ABSTRACT

A print control system 1 includes a barcode reader BR; a printer 12 that receives read result data transmitted from the barcode reader BR and transmits the read result data by a WebSocket connection CT; a control server 10 that receives and transmits the read result data from the printing device; a management device 14 that receives and transmits the read result data from the control server 10; and a tablet terminal 9 that receives the read result data from the management device 14 and generates print command data based on the read result data.

11 Claims, 7 Drawing Sheets

PRINT CONTROL SYSTEM AND PRINT
CONTROL METHOD

Priority is claimed under 35 U.S.C. § 119 to Japanese Application no. 2013-247390 filed on Nov. 29, 2013 which is hereby incorporated by reference in their entirety.

BACKGROUND

1. Technical Field

The present disclosure relates to a print control system that includes a printing device, and to a print control method.

2. Related Art

A print control system that prints on print media and produces receipts with a printing device as controlled by a print control device is described, for example, in JP-A-2011-108097. In this type of print control system, the printing device and a print control device are connected over a network and communicate through the network. A barcode scanner or other devices may also be connected to the printing device.

When building a system in which a printing device (printer) to which another device is connected and a print control device communicate over a network, the system must be compatible with configurations in which a printing device with a printing function and the print control device communicate over a network, and configurations in which other devices may be connected to the printer.

SUMMARY

With consideration for the foregoing problem, the present invention makes a print control system in which a printer and a print control device communicate over a network compatible with configurations in which multiple devices communicate over a network, and configurations in which another device is connected to the printer.

A print control system according to one aspect of the invention includes a device that transmits information; a printing device having a print unit that prints, a device interface the receives information transmitted from the device, and a communication unit that establishes a communication path and transmits the information by asynchronous duplex communication; a print control device having a first connection unit that receives the information transmitted from the printing device by the communication path, and a second connection unit that transmits the information; a management device having a first communication connection unit that receives the information transmitted by the print control device, and a second communication connection unit that transmits the information; and a terminal having a communication interface that receives the information, and a terminal control unit that generates a print command for the printing device based on the information.

In this configuration of the invention, information that the device sends to a printing device is transmitted through the printing device, print control device, and management device to the terminal. Based on the received information, the terminal generates print commands. As a result, information that the device connected to the printing device transmitted can be sent to the terminal, and the terminal can generate print commands reflecting the information and cause the printing device to print reflecting the information.

In this configuration of the invention the printing device and the print control device communicate by asynchronous duplex communication. As a result, the printing device can send data to the print control device at any time, and the print control device can send data to the printing device at any time. Therefore, when an event requiring data processing by the print control device occurs, the printing device can transmit the data to the print control device for processing, and when an event requiring processing by the printing device based on print control data occurs, the print control device can send print control data to the printing device and control the printing device to execute a process based on the print control data.

In another aspect of the invention, the device is a reading device that executes a reading process; and the information is information read by the reading device.

In this aspect of the invention, the read result from the reading device connected to the printing device can be sent to the terminal, and the terminal can generate print commands based on the read result.

Further preferably, the reading device reads a product code; the information is information based on the product code; and the management device has a control unit that acquires information related to the product based on the received information.

Thus comprised, information related to the product corresponding to the product code read by the reading device can be acquired by a function of the management device, and by the management device sending the information related to the product to the terminal, the terminal can generate print commands reflecting the information related to the product.

Further preferably, the terminal has a display unit that displays; the communication interface receives the information related to the product that was acquired by the control unit of the management device; and the terminal control unit of the terminal displays the information related to the product on the display unit.

In this aspect of the invention, the terminal displays information related to a product on the display unit, and can thereby present the product-related information to the user.

In another aspect of the invention, the asynchronous duplex communication is WebSocket communication.

This configuration of the invention enables the printing device and the print control device to communicate by asynchronous duplex communication through a WebSocket connection.

In a print control system according to another aspect of the invention, the second communication connection unit of the management device receives the print command generated by the terminal; the first communication connection unit of the management device transmits the print command to the print control device; and the print control device has a print control unit that generates print control data based on the received print command.

With this configuration of the invention, the print control device can generate print control data based on the print commands from the management device, and by sending the print control data to the printing device, can cause the printing device to print reflecting the information sent from the device.

In another aspect of the invention, the first connection unit of the print control device transmits the print control data to the printing device; and the print unit of the printing device prints based on the print control data.

This configuration of the invention enables the printing device to print reflecting information sent from the device based on the print control data.

Another aspect of the invention is a print control method, including: transmitting information by a device; receiving the information from the device by a printing device;

transmitting the received information by asynchronous duplex communication; receiving the information from the printing device by a print control device; transmitting the received information; receiving the information from the print control device by a management device; transmitting the received information; receiving the information from the management device by a terminal; and generating a print command for the printing device based on the information.

In this configuration of the invention, information that the device sends to a printing device is transmitted through the printing device, print control device, and management device to the terminal. Based on the received information, the terminal generates print commands. As a result, information that the device connected to the printing device transmitted can be sent to the terminal, and the terminal can generate print command data reflecting the information and cause the printing device to print reflecting the information.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
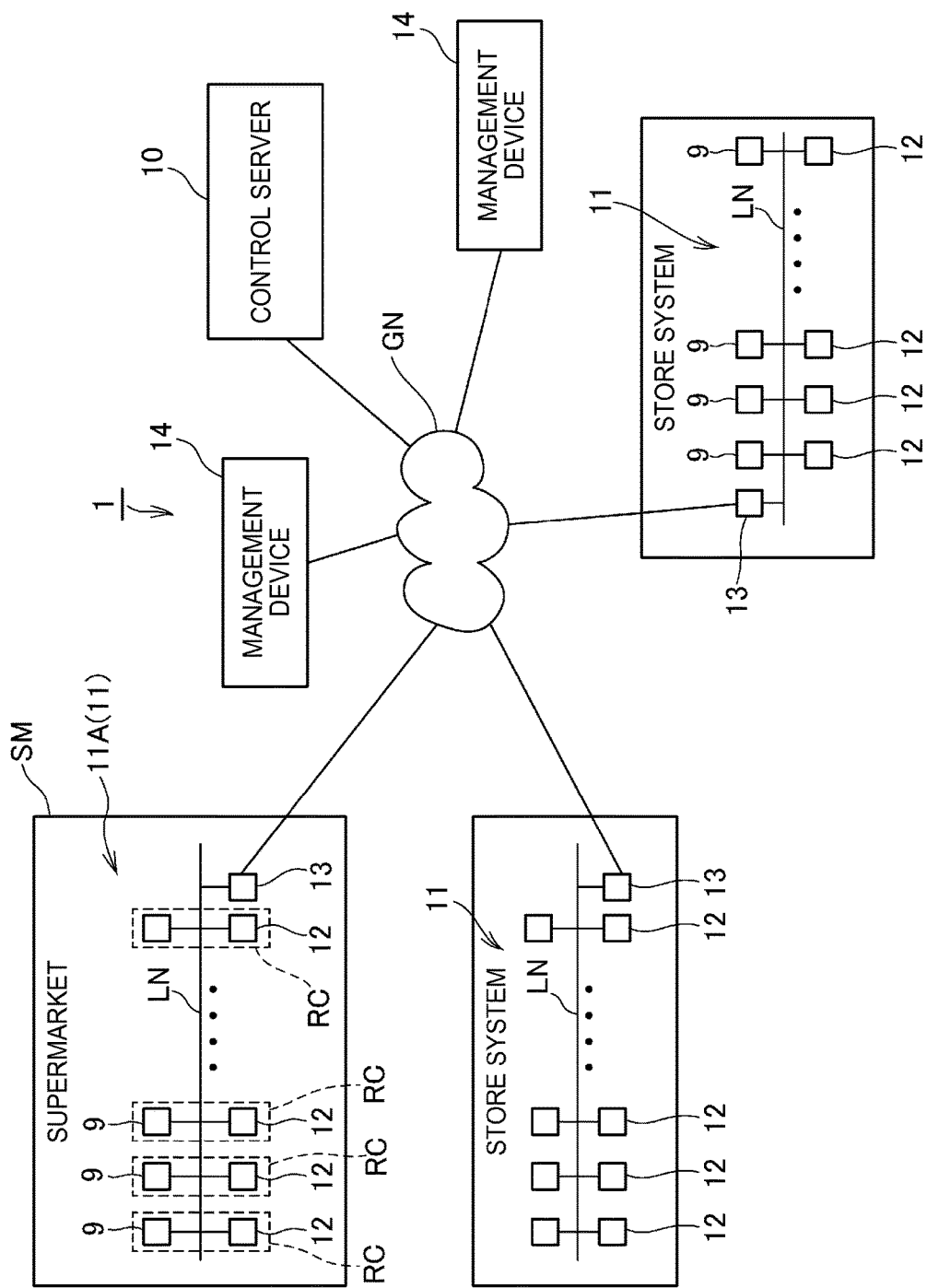
FIG. 1 shows the configuration of a control system according to a preferred embodiment of the invention.

FIG. 1 shows the configuration of a control system 1 (print control system) according to a preferred embodiment of the invention.

As shown in FIG. 1, the control system 1 includes a control server 10 (print control device), and a plurality of store systems 11 connected to the control server 10 through the Internet or other network GN. Plural management devices 14 are also connected to the network GN.

The store system 11 is a system that is used in retail businesses such as supermarkets, convenience stores, department stores, and restaurants. The store system 11 has functions including producing receipts for customers of the business.

One or more checkout counters RC are set up in each store system 11. A printer 12 and a tablet terminal 9 (terminal) are disposed to each checkout counter RC. The printer 12 has a printing function for printing on print media, and can produce receipts. The tablet terminal 9 is a tablet computer.

In this embodiment of the invention a touch panel 31 is disposed to the front of the tablet terminal 9, and information can be input by touch operations on the touch panel 31. The tablet terminal 9 also provides a user interface enabling the checkout clerk to input transaction-related information at the checkout counter RC. As described further below, receipts are produced by the printer 12 according to the information input to the user interface of the tablet terminal 9 by a function of the control server 10.

The printer 12 and the tablet terminal 9 connect to a local area network LN deployed in the business. A network communication controller 13 configured with a communication device such as a network router or modem connects to the local area network LN. The printer 12 and the tablet terminal 9 access the network GN through the network communication controller 13.

For example, the store system 11A in this example is a system used in a supermarket SM. Plural checkout counters RC are set up in the supermarket SM, and a printer 12 and tablet terminal 9 are installed at each checkout counter RC. The printers 12 and the tablet terminals 9 in the store system 11A are connected to the local area network LN, and access the network GN through the network communication controller 13.

In the control system 1 according to this embodiment of the invention the printer 12 of the store system 11 establishes a connection with the control server 10, and communicates with the control server 10. The printer 12 prints as controlled by the control server 10.

The management device 14 is a device that manages one or more store systems 11 as described below. For example, the management device 14 may be installed in the headquarters of a company that operates multiple stores, and manage the store systems 11 deployed in one or more stores associated with the corporate group. As described below, the management device 14 can control specific printers 12 in the managed store systems 11, and command the specific printers 12 to print.

Figure 2:
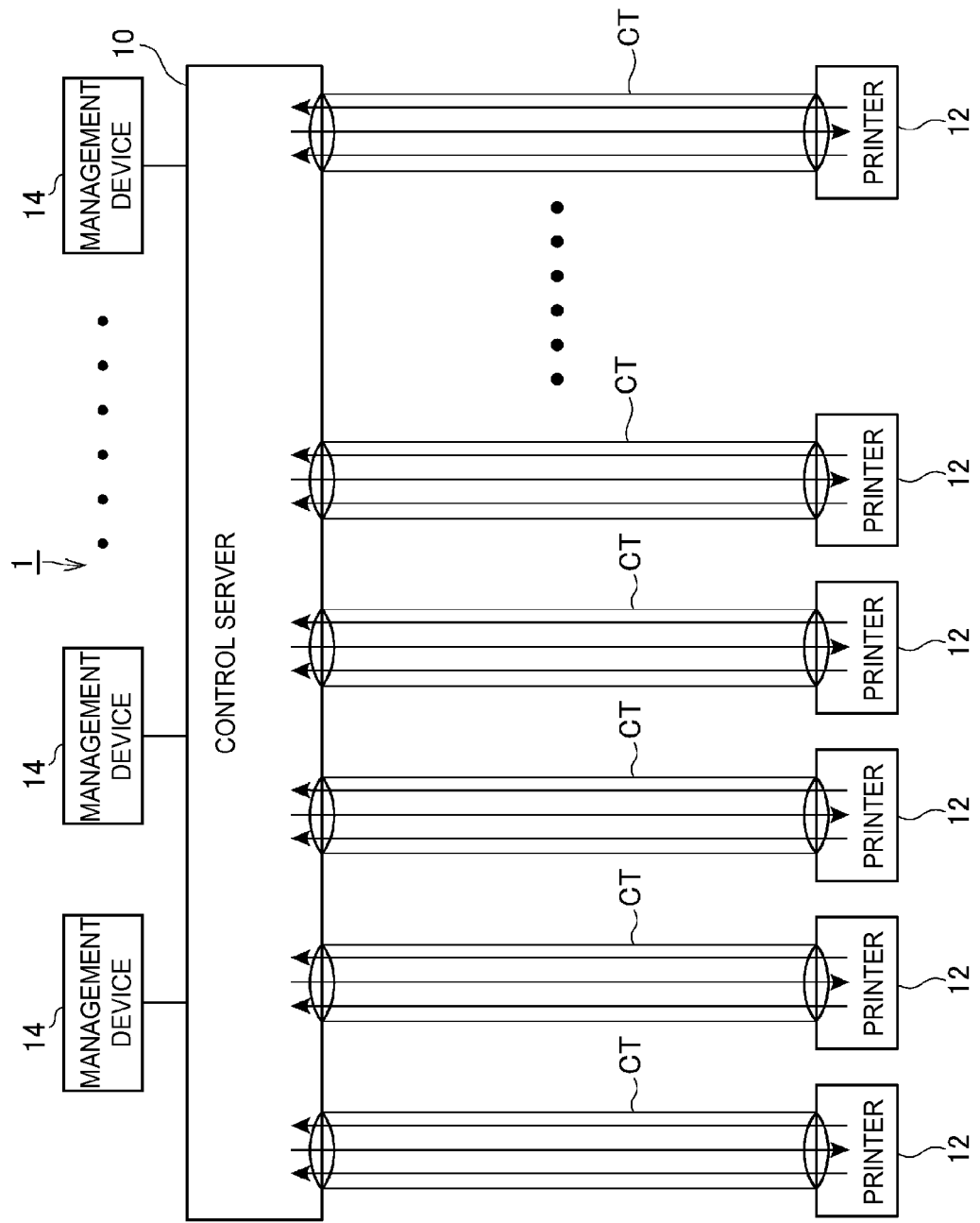
FIG. 2 illustrates communication paths opened between a control server and printers.

FIG. 2 illustrates the communication paths established between the control server 10 and the printers 12 in the control system 1.

As shown in FIG. 2, a WebSocket connection CT (communication path) is established between the control server 10 and the printers 12 in each store system 11.

WebSocket is a communication standard that enables asynchronous duplex communication. After a server and client open a WebSocket connection CT using the WebSocket standard, sending and receiving data between the devices uses the protocol by means of the connection. It is therefore not necessary to establish a connection every time data is transmitted.

The WebSocket connection CT is a logical communication path for sending and receiving data according to the WebSocket protocol and procedures between the printer 12 and control server 10 connected through the WebSocket connection CT. Therefore, once the printer 12 and control server 10 handshake and establish a WebSocket connection CT, the printer 12 and control server 10 can exchange data asynchronously over the WebSocket connection CT. More specifically, the control server 10 can send data to the printer 12 through the WebSocket connection CT at any time, and the printer 12 can send data to the control server 10 through the WebSocket connection CT.

WebSocket communication is asynchronous, duplex communication between the printer 12 and control server 10 through the WebSocket connection CT based on the WebSocket protocol and methods.

By establishing a WebSocket connection CT, the printer 12 and the control server 10 can communicate by asynchronous, duplex communication. The control server 10 can push data to the printer 12 by WebSocket communication through the WebSocket connection CT without receiving a request from the printer 12 operating as a client device.

The printer 12 and control server 10 communicate by asynchronous, duplex communication through the WebSocket connection CT. More specifically, the control server 10 can push data to the printer 12 by WebSocket communication through the WebSocket connection CT without receiving a request from the printer 12 operating as a client device at any time. Likewise, the printer 12 can push data to the control server 10 through the WebSocket connection CT at any time.

Plural management devices 14 are also communicatively connected to the control server 10. As described below, the management device 14 can send print data to a specific printer 12 through the control server 10, and command that specific printer 12 to print.

In this embodiment of the invention the control server 10 is a cloud server in a so-called cloud system in which the printer 12 is a client device. The control server 10 can process data, execute a specific operation when triggered by receiving a request from the printer 12 or a request from the management device 14, and send data based on the result of the process through the WebSocket connection CT to the printer 12.

In FIG. 2 the control server 10 is represented as a single block, but this does not mean that the control server 10 is configured from a single server. For example, the control server 10 may be configured from multiple servers, or it may be a server rendered by a function of a specific system. More specifically, the control server 10 may be any configuration that can execute the processes described herein.

The control server 10 and printer 12 communicate according to the WebSocket communication protocol in this embodiment. The invention is not limited to WebSocket communication, however, and other configurations capable of asynchronous, duplex communication similarly to WebSocket communication may be used.

The control system 1 thus has multiple (such as a 1000) printers 12 each capable of printing communicatively connected through a WebSocket connection CT to a control server 10.

Such a configuration enables the following.

The control server 10 can collect, manage, and analyze information based on data received from the plural printers 12 connected to the store system 11. The control server 10 can therefore collect valuable information. The collected information can be used as "big data."

Constructing a store system 11 can also be made easier and cheaper. More specifically, the printer 12 is connected to the control server 10 by a WebSocket connection CT in this control system 1. Using a service provided by the control server 10, this enables controlling the printers 12 to execute processes as controlled by the control server 10. An administrator constructing a store system 11 can therefore build the store system 11 by simply installing the printers 12 where desired, and then connecting the printers 12 to the network GN. This enables controlling the printers 12 to execute a desired process, such as a process related to producing receipts, using a service provided by the control server 10.

The administrator configuring the store system 11 therefore does not need to embed a function for controlling the printers 12 in the management device 14 that manages the store system 11. More specifically, by accessing the control server 10 and using a service provided by the control server 10, the management device 14 can control the printers 12 connected to the control server 10. Configuring the store system 11 can therefore be simplified, and cost can be reduced.

In addition, because printers 12 from different store systems 11 are connected to the control server 10 by a WebSocket connection CT, the control server 10 can manage the plural printers 12 in the plural store systems 11. The control server 10 can also control operation of the plural printers 12 connected in the plural store systems 11.

Figure 3:
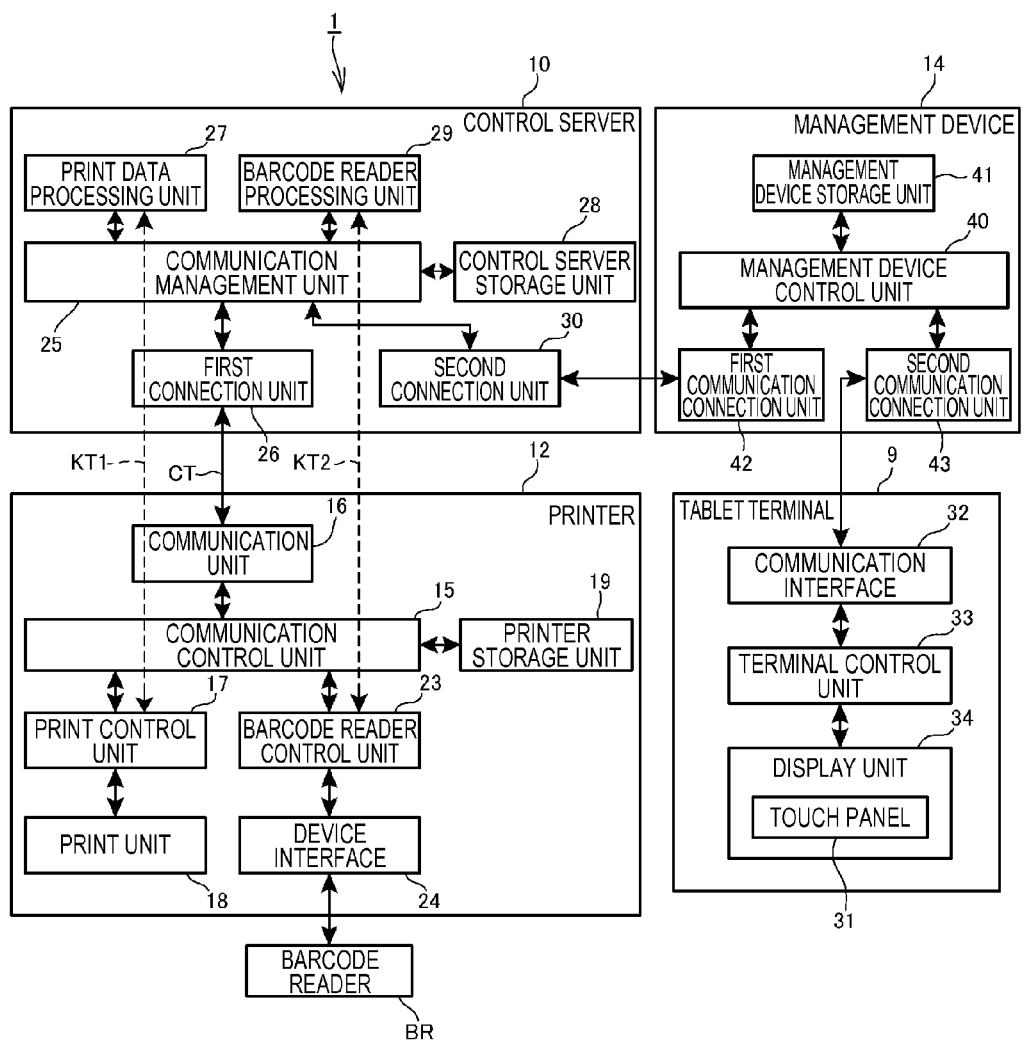
FIG. 3 is a block diagram showing the functional configuration of devices in the control system.

FIG. 3 is a block diagram illustrating the functional configuration of the printer 12, the control server 10, the management device 14, and the tablet terminal 9 in this embodiment of the invention.

As shown in FIG. 3, the printer 12 includes a communication control unit 15, a communication unit 16, a print control unit 17, a print unit 18, a barcode reader control unit 23, a device interface 24 and printer storage unit 19.

The functions of the communication control unit 15, communication unit 16, print control unit 17, and barcode reader control unit 23 are described below.

The print unit 18 includes mechanisms related to printing, such as a print mechanism that prints on print media, a conveyance mechanism that conveys the print media, and a cutting mechanism that cuts the print media, and control boards related to controlling the mechanisms.

The device interface 24 connects to the barcode reader BR (device, reading device), and communicates with the barcode reader BR according to a specific communication protocol as controlled by the barcode reader control unit 23. The device interface 24 sends data received from the barcode reader BR to the barcode reader control unit 23, and sends data received from the barcode reader control unit 23 to the barcode reader BR. The connection to the barcode reader BR may be a wired connection or a wireless connection. The barcode reader BR optically reads barcodes from products or product packaging.

The printer storage unit 19 is nonvolatile memory, and stores data. Address data 19a and printer identification information 19b, further described below, are stored in the printer storage unit 19.

As shown in FIG. 3, the control server 10 includes a communication management unit 25, a first connection unit 26, a print data processing unit 27, a barcode reader processing unit 29, a control server storage unit 28, and a second connection unit 30.

The functions of the communication management unit 25, the first connection unit 26, the print data processing unit 27, and the barcode reader processing unit 29 are described further below.

The control server storage unit 28 is nonvolatile memory, and stores data. The control server storage unit 28 stores a first connection management database 28a and a second connection management database 28b, which are described further below.

The second connection unit 30 communicates with the management device 14 according to a specific communication protocol through the connection KK established with the management device 14 according to the specific communication protocol as controlled by the communication management unit 25. The specific communication protocol may be WebSocket, HTTP, or other communication standard.

The control server 10 has two process units, the print data processing unit 27 and the barcode reader processing unit 29, and these process units are process units with different functions.

As shown in FIG. 3, the management device 14 includes a management device control unit 40 (control unit), a management device storage unit 41, a first communication connection unit 42, and a second communication connection unit 43.

The management device control unit 40 includes a CPU, ROM, RAM, and other peripheral circuits, and controls the management device 14.

The management device storage unit 41 includes non-volatile memory, and stores data. The management device storage unit 41 stores a product database 41a. The product database 41a is a database that relationally stores product code, product name, price and other product-related information for the products sold in the store.

The first communication connection unit 42 communicates according to a specific communication protocol with the control server 10 through the connection KK as controlled by the management device control unit 40.

The second communication connection unit 43 communicates with the tablet terminal 9 through the network GN as controlled by the management device control unit 40.

As shown in FIG. 3, the tablet terminal 9 includes a terminal control unit 33, a display unit 34, a touch panel 31, and a communication interface 32.

The terminal control unit 33 includes a CPU, ROM, RAM, and other peripheral circuits, and controls the tablet terminal 9.

The display unit 34 includes the touch panel 31. The touch panel 31 includes a display panel such as an LCD panel disposed to the front of the tablet terminal 9, and a touch sensor disposed over the display panel. The touch panel 31 displays images on the display panel as controlled by the terminal control unit 33. The touch panel 31 detects touch operations by the touch sensor, and outputs the result to the terminal control unit 33.

FIG. 3 shows the relationship between the control server 10 and one printer 12 connected to the control server 10. When multiple printers 12 are connected to the control server 10, the control server 10 has as many first connection units 26 (WebSocket interfaces) as printers 12, establishes one WebSocket connection CT between one first connection unit 26 and one printer 12, and communicates with the one printer 12 by the WebSocket standard through the WebSocket connection CT.

FIG. 3 also shows the relationship between the control server 10 and one management device 14 connected to the control server 10. When multiple management devices 14 are connected to the control server 10, the control server 10 has as many second connection units 30 (WebSocket interfaces) as management devices 14, establishes one WebSocket connection CT between one second connection unit 30 and one management device 14, and communicates with the one management device 14 through the connection KK.

The operation of the printer 12 and the control server 10 when the printer 12 power turns on is described next.

Figure 4:
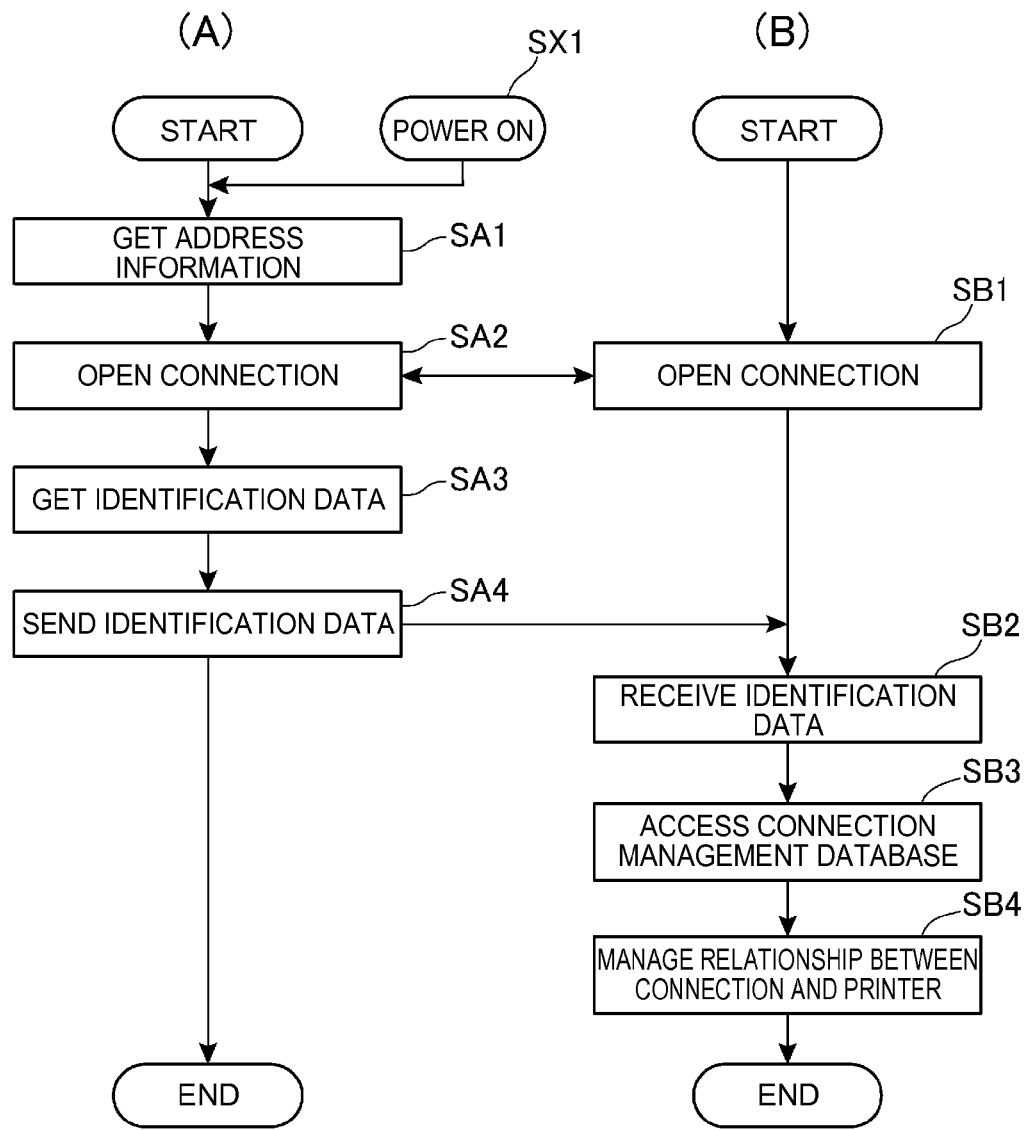
FIG. 4 is a flow chart showing the operation of a printer and the control server.

FIG. 4 is a flow chart showing the operation of the printer 12 and the control server 10 when the printer 12 power turns on, (A) showing the operation of the printer 12, and (B) showing the operation of the control server 10.

The trigger of the process shown in the flow chart in FIG. 4 is not limited to the power turning on. For example, this process may be triggered by the printer 12 connecting to the network GN and enabling communication, or by an instruction from a user.

Note that in the operation described below the printer 12 is connected to the local area network LN of the store system 11 in which it is used, and can access the network GN.

The functions of the communication control unit 15, print control unit 17, and barcode reader control unit 23 of the printer 12, and the communication management unit 25, the print data processing unit 27, and the barcode reader processing unit 29 of the control server 10 are described below.

More specifically, these function blocks are software objects. An object is an instance created in an object-oriented programming language, and more specifically is a software function block defined by a set of data and methods. The function of a particular function block is rendered by calling (invoking) a method of an object.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in column (A) of FIG. 4, when the printer 12 power turns on (step SX1), the communication control unit 15 accesses the printer storage unit 19 and gets the address data stored in the printer storage unit 19 (step SA1).

The address data 19a is data identifying the address (such as the domain name, IP address, or path name) of the control server 10 to access when the WebSocket connection CT is established. When opening a WebSocket connection CT according to the WebSocket protocol, the client (the printer 12 in this example) handshakes with the server (the control server 10 in this example) using HTTP (Hypertext Transfer Protocol). When handshaking, the client sends a message containing the address of the server, and the address data 19a is data representing this address.

Next, the communication control unit 15 establishes a WebSocket connection CT between the communication management unit 25 of the control server 10 through the communication unit 16 and the first connection unit 26 based on the address contained in the address data 19a (step SA2, step SB1). The printer 12 according to this embodiment establishes a WebSocket connection CT when triggered by the power turning on without receiving an instruction from the user or a request from the control server 10.

The communication unit 16 and first connection unit 26 are WebSocket interfaces enabling data communication based on the WebSocket protocol and methods. These function blocks are instantiated using a WebSocket Socket.IO library, for example.

More specifically, the communication unit 16 has functions for processing data that is received from the communication control unit 15 according to WebSocket, and sending the data through the WebSocket connection CT based on WebSocket methods. The communication unit 16 also has functions for processing data that is received through the WebSocket connection CT according to WebSocket, and sending to the communication control unit 15. The first connection unit 26 is similarly configured.

By establishing a WebSocket connection CT, the printer 12 and control server 10 can communicate through an asynchronous, duplex communication link. More specifically, the control server 10 can push data to the printer 12 through the WebSocket connection CT without receiving a request from the printer 12 operating as a client.

Next, the communication control unit 15 of the printer 12 accesses the printer storage unit 19 and gets the printer identification information 19b stored in the printer storage unit 19 (step SA3). The printer identification information 19b is data representing the identification information of the printer 12 (referred to below as printer identification information). The printer identification information is, for example, a serial number assigned to the printer 12 when the printer 12 is manufactured.

Next, the communication control unit 15 sends the printer identification data 19b by the WebSocket connection CT (step SA4).

As shown in column (B) of FIG. 4, the communication management unit 25 of the control server 10 receives the printer identification data 19b (step SB2).

Next, the communication management unit 25 accesses the first connection management database 28a stored in the control server storage unit 28 (step SB3). The first connection management database 28a is a database relationally storing for the WebSocket connections CT that were established connection identification information identifying the WebSocket connection CT and the printer identification information of the printer.

Next, the communication management unit 25 creates one record in the first connection management database 28a. The communication management unit 25 then relationally stores in the created record the connection identification information of the WebSocket connection CT established in step SB1 and the printer identification information indicated by the printer identification data 19b received in step SB2 (step SB4).

Note that when a WebSocket connection CT is opened, the communication management unit 25 generates connection identification information for that connection that is different from the connection identification information of any other WebSocket connection CT that was already opened. The relationship between the WebSocket connections CT and printers 12 is managed by the process of step SB4.

A WebSocket connection CT is thus established when triggered by the power turning on without receiving a user instruction or a request from the control server 10. Thus comprised, the user does not need to perform a complicated operation to open a WebSocket connection CT. Special knowledge is also not needed to open a WebSocket connection CT. After the power turns on, the printer 12 can execute processes as controlled by the control server 10.

A WebSocket connection CT is thus established between the communication unit 16b and first connection unit 26b. As a result, a first function unit communication path KT1 based on the WebSocket connection CT is established between the print control unit 17 of the printer 12, and the print data processing unit 27 of the control server 10. The first function unit communication path KT1 is a logical communication path for data communication between the print control unit 17 and print data processing unit 27. The print control unit 17 and print data processing unit 27 can communicate by asynchronous duplex communication through the first function unit communication path KT1. Asynchronous duplex communication through the first function unit communication path KT1 is described further below.

By establishing a WebSocket connection CT, a second function unit communication path KT2 based on the WebSocket connection CT is established between the barcode reader control unit 23 of the printer 12 and the barcode reader processing unit 29 of the control server 10. The second function unit communication path KT2 is a logical communication path for sending and receiving data communicated between the barcode reader control unit 23 and the barcode reader processing unit 29. The barcode reader control unit 23 and the barcode reader processing unit 29 communicate by asynchronous duplex communication by the second function unit communication path KT2. Asynchronous duplex communication by the second function unit communication path KT2 is described further below.

Operation during the transaction process, that is, device operation from when transaction-related information is input to the tablet terminal 9 until a the printer 12 produces a receipt based on the input information, is described next.

Figure 5:
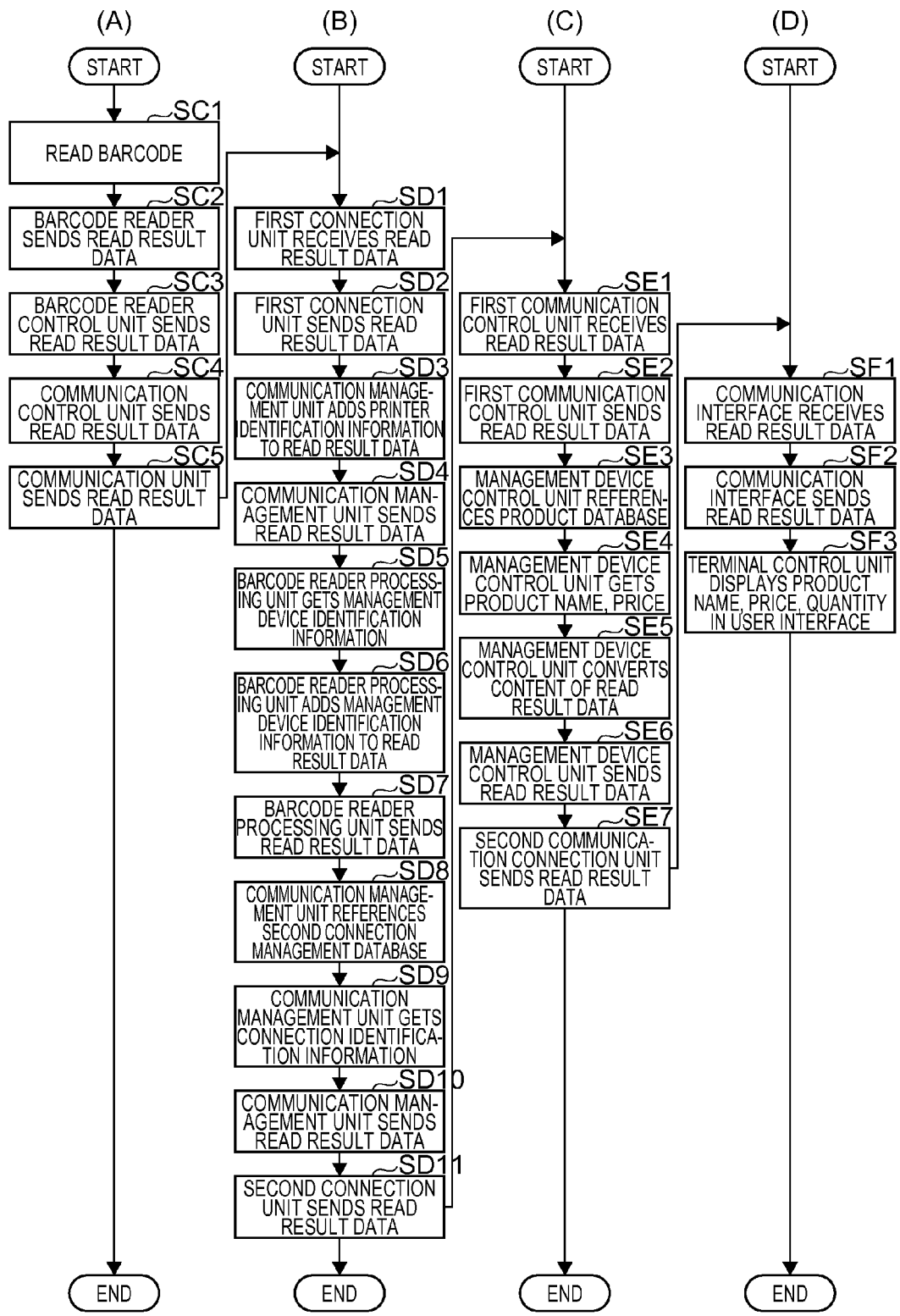
FIG. 5 is a flow chart showing the operation of devices in the control system.

FIG. 5 is a flow chart showing the operation of devices in the print control system 1 when processing a transaction. Column (A) shows the operation of the tablet terminal 9, column (B) shows the operation of the management device 14, column (C) shows the operation of the control server 10, and column (D) shows the operation of the printer 12.

In the operation described below, the printer 12 and the tablet terminal 9 are installed at the same checkout counter RC in one store system 11. More specifically, the process executed by the devices from when the checkout clerk inputs information related to the transaction to the tablet terminal 9 until a receipt on which the transaction-related information is printed by the printer 12 is issued at the same checkout counter RC is described below.

Asynchronous duplex communication through the second function unit communication path KT2 between the barcode reader control unit 23 and the barcode reader processing unit 29 is described below using by way of example the barcode reader control unit 23 transmitting data.

Before the operation shown in the flow chart in FIG. 5 is executed, the following process is performed by the checkout clerk or other worker. This process is done when the store opens for business each day, for example.

More particularly, the checkout clerk starts an application previously installed on the tablet terminal 9. When the application starts, the terminal control unit 33 displays a first user interface 35 on the touch panel 31 by a function of the application.

The first user interface 35 may be presented in a browser window as a result of accessing a specific server (the control server 10 or the management device 14 functioning as a server) by a function of the browser.

Figure 6B:
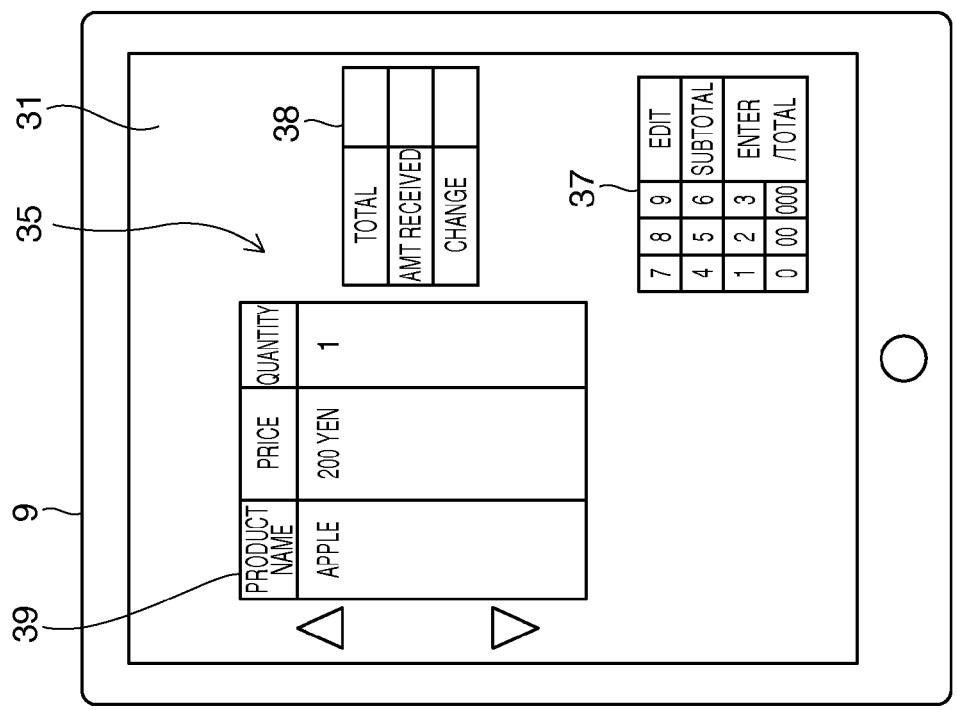
FIGS. 6A and 6B show an example of a user interface provided by a tablet terminal.
Figure 6A:
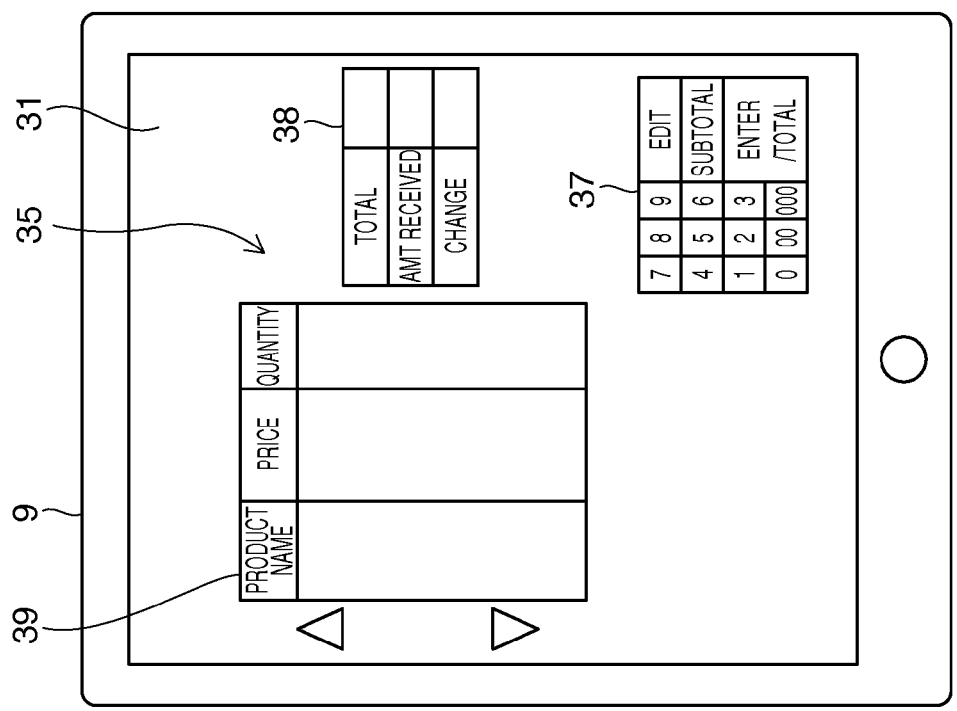

FIG. 6A shows an example of the first user interface 35 presented on the touch panel 31.

As shown in FIG. 6A, a list display area 39 where the names of the products purchased by the customer, the prices of the products, and the quantities of the products are presented in a list is displayed at the top left of the first user interface 35. To the right of this list display area 39 is displayed an amount display area 38 where the total amount of the products purchased by the customer, the amount of money received from the customer, and the amount of change due to the customer are displayed. Below the amount display area 38 is a virtual keypad 37.

As shown in column (A) of FIG. 5, when processing a transaction at the checkout counter RC, the checkout clerk scans the barcode of the product the customer is purchasing with the barcode reader BR (step SC1). When the barcode is read, read result data (information) containing information identifying the read result from the barcode reader BR is sent from the barcode reader BR through the device interface 24 to the barcode reader control unit 23 (step SC2).

The read result data is data in a specific format configured to include the product code of the product from which the barcode was read by the barcode reader BR.

The barcode reader control unit 23 then sends the received read result data to the communication control unit 15 (step SC3).

The communication control unit 15 sends the received read result data to the communication unit 16 (step SC4).

The communication unit 16 sends the received read result data by the WebSocket connection CT to the control server 10 (step SC5).

As shown in column (B) of FIG. 5, the first connection unit 26 receives the read result data by the WebSocket connection CT (step SD1). Next, the first connection unit 26 sends the received read result data to the communication management unit 25 (step SD2).

The communication management unit 25 adds the printer identification information of the printer 12 to the read result data (step SD3). In step SD3, the communication management unit 25 references the first connection management database 28a, and gets the printer identification information of the printer 12 based on the relationship between the WebSocket connection CT and the printer 12. Next, the communication management unit 25 sends the read result data to the barcode reader processing unit 29 (step SD4).

The barcode reader processing unit 29 then gets the management device identification information, which identifies the management device 14 that sent the read result data (step SD5). The barcode reader processing unit 29 manages, for each printer 12 connected to the control server 10, the relationship between the printer identification information of the printer 12 and the management device identification information of the management device 14 that sent the received read result data. Therefore, in step SD5, the barcode reader processing unit 29 gets the management device identification information based on the printer identification information.

Next, the barcode reader processing unit 29 adds the management device identification information acquired in step SD5 to the received read result data (step SD6).

Next, the barcode reader processing unit 29 sends the read result data to the communication management unit 25 (step SD7).

The communication management unit 25 references the second connection management database 28b (step SD8). The second connection management database 28b is a database that relationally stores the connection identification information and the management device identification information for the connection KK between the management device 14 and the control server 10.

Next, the communication management unit 25 acquires the connection identification information of the connection KK related to the management device identification information from the second connection management database 28b using the management device identification information added to the read result data received from the barcode reader processing unit 29 as the search key (step SD9).

Next, the communication management unit 25 sends the read result data to the second connection unit 30 related to the connection KK identified by the connection identification information acquired in step SD9 (step SD10).

The second connection unit 30 the sends the read result data by the connection KK to the management device 14 (step SD11).

As shown in column (C) of FIG. 5, the first communication connection unit 42 of the management device 14 receives the read result data by the connection KK (step SE1). Next, the first communication connection unit 42 sends the received read result data to the management device control unit 40 (step SE2).

The management device control unit 40 then references the product database 41a stored by the management device storage unit 41 (step SE3). Next, the management device control unit 40 searches the product database 41a using the product code contained in the received read result data as the search key, and gets the name and the price of the product identified by the product code (step SE4). In other words, the management device control unit 40 (control unit) gets information related to the product based on the received read result data (information). Next, the management device control unit 40 converts the read result data to data containing information identifying the name and price of the product (step SE5). The product code or other information related to the product may also be contained in the converted data in addition to the product name and price. Next, the management device control unit 40 sends the read result data to the second communication connection unit 43 (step SE6).

Note that for each managed printer 12, the management device control unit 40 manages the relationship between the identification information of the tablet terminal 9 and the printer identification information of the printer 12 installed at the checkout counter RC. The management device control unit 40 manages the relationship between the identification information of the tablet terminal 9 and the second communication connection unit 43. In step SE6, the management device control unit 40 gets the identification information of the tablet terminal 9 based on the printer identification information contained in the read result data, and sends the read result data to the second communication connection unit 43 related to the acquired identification information of the tablet terminal 9. The second communication connection unit 43 then sends the read result data to the tablet terminal 9 (step SE7).

As shown in column (D) of FIG. 5, the communication interface 32 of the tablet terminal 9 receives the read result data (step SF1). Next, the communication interface 32 sends the read result data to the terminal control unit 33 (step SF2).

Based on the received read result data, the terminal control unit 33 displays information indicating the product name, price, and quantity in the list display area 39 of the first user interface 35 (step SF3).

FIG. 6B shows an example of the first user interface 35 after step SF3.

As shown in FIG. 6B, the name, price, and quantity of the product are displayed in the list display area 39 of the first user interface 35 based on the read result from the barcode reader BR as a result of the devices executing the process described in the flow chart in FIG. 5.

Operation during the transaction process, that is, device operation from when transaction-related information is input to the tablet terminal 9 until a the printer 12 produces a receipt based on the input information, is described next.

Figure 7:
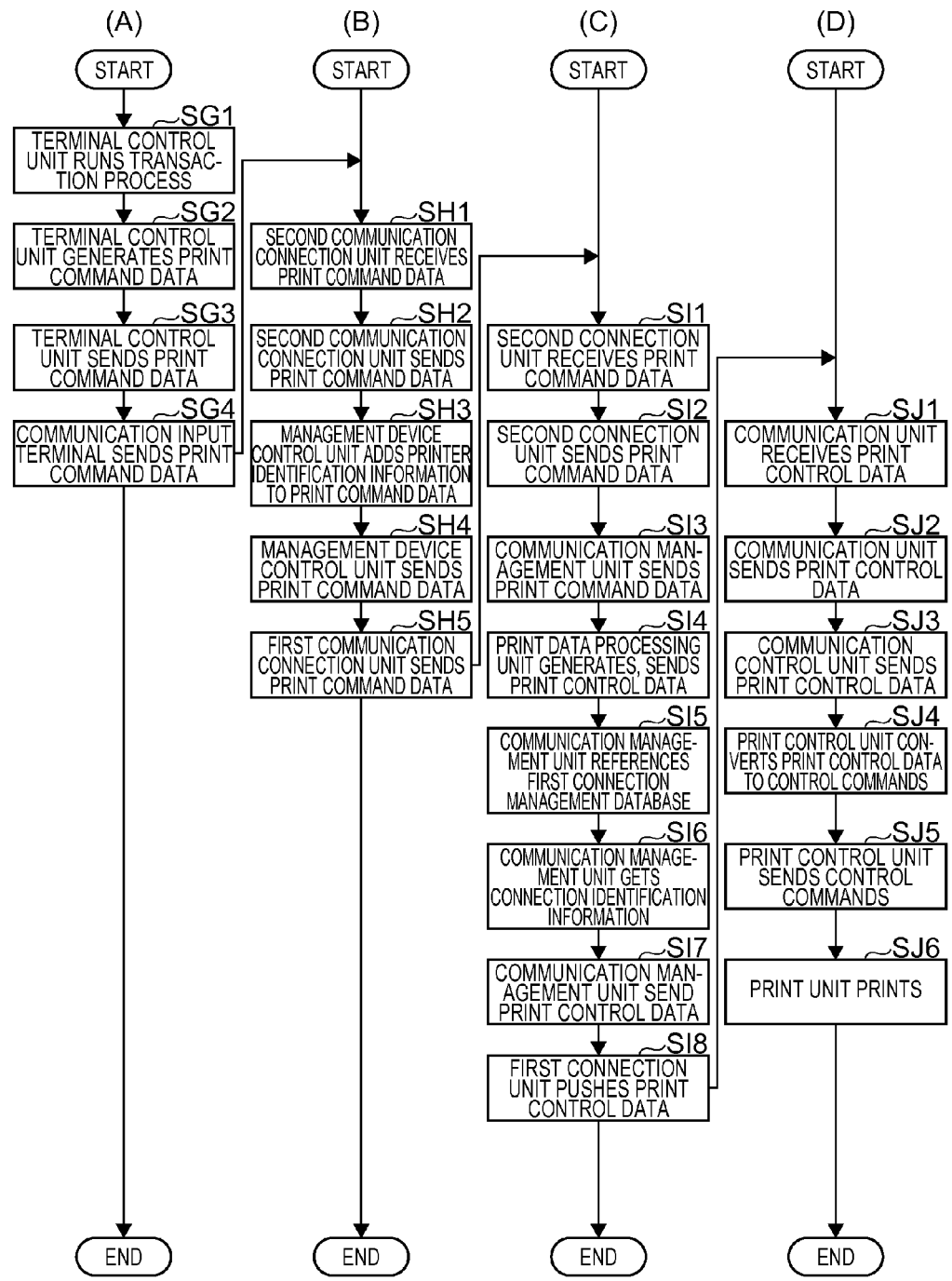
FIG. 7 is a flow chart showing the operation of devices in the control system.

FIG. 7 is a flow chart showing the operation of devices in the print control system 1 when processing a transaction. Column (A) shows the operation of the tablet terminal 9, column (B) shows the operation of the management device 14, column (C) shows the operation of the control server 10, and column (D) shows the operation of the printer 12.

In the operation described below, the printer 12 and the tablet terminal 9 are installed at the same checkout counter RC in one store system 11. More specifically, the process executed by the devices from when the checkout clerk inputs information related to the transaction to the tablet terminal 9 until a receipt on which the transaction-related information is printed by the printer 12 is issued at the same checkout counter RC is described below.

As shown in column (A) of FIG. 7, the terminal control unit 33 of the tablet terminal 9 executes the transaction process (step SG1). The transaction process in step SG1 is done as described below. During a transaction, the read result data based on the result of reading the barcodes of the products purchased by the customer with the barcode reader BR, data based on input to the first user interface 35 through the virtual keypad 37, and other transaction-related data is sent to the terminal control unit 33. Based on the read result data and other received data, the terminal control unit 33 calculates the total purchase amount, and displays the calculated total purchase amount in the specific area of the amount display area 38. Payment is then received from the customer and change is made by the checkout clerk at the checkout counter RC, and the terminal control unit 33 displays the appropriate information in the amount display area 38 according to these steps.

After the transaction is processed in step SG1, the terminal control unit 33 generates print command data (print commands) instructing producing a receipt printed with the transaction-related information based on the received read result data and the information input to the first user interface 35 (step SG2). More specifically, the terminal control unit 33 generates print commands (print command data) for the printer 12 based on the read result data (information) sent from the barcode reader BR (device).

Next, the terminal control unit 33 sends the print command data to the communication interface 32 (step SG3).

The communication interface 32 sends the print command data to the management device 14 (step SG4).

As shown in column (A) of FIG. 7, the second communication connection unit 43 receives the print command data (step SH1). Next, the second communication connection unit 43 sends the received print command data to the management device control unit 40 (step SH2).

The management device control unit 40 adds the printer identification information of the printer 12 that is to print to the print command data (step SH3). As described above, for each managed printer 12, the management device control unit 40 manages the relationship between the printer identification information of the printer 12 installed at the checkout counter RC and the identification information of the tablet terminal 9.

Next, the management device control unit 40 sends the print command data to the first communication connection unit 42 (step SH4).

The first communication connection unit 42 sends the received print command data by the connection KK to the control server 10 (step SH5).

As shown in column (C) of FIG. 7, the second connection unit 30 of the control server 10 receives the print command data by the connection KK (step SI1).

Next, the second connection unit 30 sends the print command data to the communication management unit 25 (step SI2).

The communication management unit 25 sends the received print command data to the print data processing unit 27 (step SI3).

Based on the received print command data, the print data processing unit 27 generates and outputs print control data for controlling the printer 12 to the communication management unit 25 (step SI4). The print control data is an XML (eXtensible Markup Language) file containing the information to be printed by the printer 12. The print control data includes the information to be printed by the printer 12, such as image data and information indicating the position of each image, in an XML format.

The communication management unit 25 accesses the first connection management database 28a stored by the control server storage unit 28 (step SI5).

Next, using the printer identification information of the printer 12 to which the print control data is sent as the search key, the communication management unit 25 gets the connection identification information of the WebSocket connection CT related to the printer identification information from the first connection management database 28a (step SI6). The connection identification information acquired by the communication management unit 25 in step SI6 is the connection identification information of the WebSocket connection CT established to the printer 12 that is to print (product a receipt). The printer identification information is contained in the print command data.

Next, the communication management unit 25 sends the print control data to the first connection unit 26 corresponding to the WebSocket connection CT identified by the connection identification information acquired in step SD9 (step SI7).

Next, the first connection unit 26 pushes the received print control data by WebSocket communication through the WebSocket connection CT (step SI8).

As shown in column (D) of FIG. 7, the communication unit 16 receives the print control data by the WebSocket connection CT (step SJ1). Next, the communication unit 16 sends the received print control data to the communication control unit 15 (step SJ2). Next, the communication control unit 15 sends the received print control data to the print control unit 17 (step SJ3).

The print control unit 17 then converts the received print control data to control commands in the command language of the print unit 18 (step SJ4). The print control unit 17 converts the print control data, which is an XML file, to commands that can be interpreted by the control board of the print unit 18.

Next, the print control unit 17 sends the control commands to the print unit 18 (step SJ5).

The print unit 18 then prints on the print medium based on the control commands and produces a receipt (step SJ6).

In this embodiment of the invention as described above, the control server 10 can thus generate print control data and send the generated print control data when triggered by receiving print terminal data from the management device 14 without receiving a request from the printer 12. As a result, printing can start more quickly than in a configuration in which the printer 12 intermittently sends a request to the control server 10, and the control server 10 sends print control data in response to such a request when there is a need to print with the printer 12. Consumption of resources can also be suppressed compared with a configuration in which the control server 10 queues responses to requests.

As described above, a control system 1 (print control system) according to this embodiment of the invention includes a barcode reader BR (device), a printer 12, a control server 10 (print control device), a management device 14, and a tablet terminal 9 (terminal).

The barcode reader BR sends read result data (information) containing information indicating the result of reaching to the printer 12.

The printer 12 includes a print unit 18 that prints; a device interface 24 that receives read result data (information) sent from the barcode reader BR; and a communication unit 16 that opens a WebSocket connection CT and sends the read result data by asynchronous duplex communication.

The control server 10 includes a first connection unit 26 that receives the read result data sent from the printer 12 by the WebSocket connection CT; and a second connection unit 30 that transmits the read result data.

The management device 14 includes a first communication connection unit 42 that receives the read result data sent by the control server 10, and a second communication connection unit 43 that transmits the read result data.

The tablet terminal 9 has a communication interface 32 that receives the read result data; and a terminal control unit 33 that generates print command data (print commands) for the printer 12 based on the read result data.

Thus comprised, information the barcode reader BR sent to the printer 12 is sent through the printer 12, control server 10, and management device 14 to the tablet terminal 9. Based on the received read result data, the tablet terminal 9 generates print command data. As a result, read result data sent by a barcode reader BR connected to a printer 12 can be sent to the tablet terminal 9, and the tablet terminal 9 can generate print command data reflecting the content of the read result data and control the printer 12 to print reflecting the content of the read result data. Thus comprised, the printer 12 and the control server 10 can communicate by asynchronous duplex communication. As a result, the printer 12 can send data at the desired time to the control server 10, and the control server 10 can send data at the desired time to the printer 12. Therefore, the printer 12 can send data for processing by the control server 10 when an event that requires processing data by the control server 10 occurs. In addition, the control server 10 can send print control data to the printer 12 and cause the printer 12 to execute a process based on the print control data when an event requiring the printer 12 to process print control data occurs.

In this embodiment of the invention, the read result data sent by the barcode reader BR is data including the information read by a barcode reader BR used as a reading device.

Thus comprised, the result of reading by a barcode reader BR connected to a printer 12 can be sent to the tablet terminal 9, and print command data reflecting the read result can be generated by the tablet terminal 9.

In this embodiment of the invention, the barcode reader BR reads a product code, and the read result data is information based on the product code. The management device 14 also has a management device control unit 40 that acquires product-related information based on the received read result data.

Thus comprised, information related to the product identified by the product code read by the barcode reader BR can be acquired by a function of the management device 14. By the management device 14 sending the product-related information to the tablet terminal 9, the tablet terminal 9 can generate print command data reflecting the product-related information.

The tablet terminal 9 in this embodiment of the invention has a display unit 34 that displays information. The communication interface 32 of the tablet terminal 9 receives the read result data including the product-related information acquired by the management device control unit 40 of the management device 14. The terminal control unit 33 of the tablet terminal 9 controls the display unit 34 to display the product-related information.

Thus comprised, the tablet terminal 9 can display the product-related information on the display unit 34, and present the product-related information to the user.

In this embodiment of the invention the printer 12 and the control server 10 communicate by asynchronous duplex communication through a WebSocket connection.

Furthermore, in this embodiment of the invention, the second communication connection unit 43 of the management device 14 receives the print command data generated by the tablet terminal 9, and the first communication connection unit 42 of the management device 14 sends the print command data to the control server 10. The control server 10 has a print control unit 17 that generates print control data based on the received print command data.

Thus comprised, by generating print control data based on the print command data generated by the management device 14 and sending the print control data to the printer 12, the control server 10 can cause the printer 12 to print reflecting the read result data sent from the barcode reader BR.

Furthermore, in this embodiment of the invention, the first connection unit 26 of the control server 10 sends print control data to the printer 12, and the print unit 18 of the printer 12 prints based on the print control data.

Thus comprised, the printer 12 can print reflecting the read result data sent from the barcode reader BR based on the print control data.

The invention is described above with reference to a preferred embodiment thereof, but the invention is not limited thereto and can be modified and adapted in many ways without departing from the scope of the accompanying claims.

In the embodiment described above the printer 12 is installed as part of a store system 11 deployed in a business. However, the printer 12 is not limited to being part of a store system 11, and can be used in other systems.

In addition, print control data is sent as an XML file from the control server 10 to the printer 12 in the foregoing embodiment, but the data format of the print control data is not limited to XML. For example, the print data may be data created in another markup language, or control commands in the command language of the print unit 18.

A barcode reader BR is used as an example of a device above, but the device is not limited to this example. In other examples, the device may be a card reader that reads cards, a cash register, or a display panel.

The function blocks shown in FIG. 3 can also be rendered as desired using hardware and software, and do not suggest a specific hardware configuration. Functions of the printer 12 may also be rendered by a separate externally connected device. The printer 12 can also execute the processes described above by running a program stored on an externally connected storage medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:
1. A print control system comprising:
a reader configured to optically read a barcode from a product or a product packaging and transmits information including a product code according to the read barcode in a specific format;
a printer having a print unit that prints, a reader interface that receives the information transmitted from the reader, and a communication unit that establishes a logical communication path and pushes the information by asynchronous duplex communication;

a print control server having a first connection unit that receives the information transmitted from the printer through the logical communication path, and a second connection unit that transmits the information;

a management server having a first communication connection unit that receives the information transmitted by the print control server, and a second communication connection unit that transmits the information; and a terminal having a communication interface that receives the information, and a terminal control unit that generates a print command data for the printer based on the information, wherein the print control server is configured to receive the print command data through the management server, generate print control data in a markup language format from the print command data, and push the print control data in the markup language to the printer through the logical communication path without a request from the printer as a client;

the printer is configured to receive the print control data in the markup language from the print control server, convert the print control data in the markup language to a control command in a command language of the print unit, and print based on the control command; and the reader interface and the communication unit in the printer are software objects being rendered by a CPU.

2. The print control system described in claim 1, wherein: the terminal has a display unit that displays;

the communication interface receives the product information that was acquired by the control unit of the management server; and the terminal control unit of the terminal displays the product information on the display unit.

3. The print control system described in claim 1, wherein: the asynchronous duplex communication is WebSocket communication.

4. The print control system described in claim 1, wherein: the second communication connection unit of the management server receives the print command generated by the terminal;

the first communication connection unit of the management server transmits the print command to the print control server; and the print control server has a print control unit that generates print control data based on the received print command.

5. The print control system described in claim 4, wherein: the first connection unit of the print control server transmits the print control data to the printer; and the print unit of the printer prints based on the print control data.

6. A print control method, comprising:

optically reading a barcode from a product or a product packaging by a reader transmitting information including a product code according to the read barcode in a specific format by the reader;

receiving the information from the reader by a printer;

pushing the information through asynchronous duplex communication by the printer;

receiving the information from the printer through a logical communication path established by the printer by a print control server;

transmitting the information by the print control server;

receiving the information from the print control server by a management server;

transmitting the information by the management server;

receiving the information from the management server by a terminal; and generating a print command data for the printer based on the information;

wherein the print control server receives the print command data through the management server, generates print control data in a markup language format from the print command data, and pushes the print control data in the markup language to the printer through the logical communication path without a request from the printer as a client;

the printer receives the print control data in the markup language from the print control server, converts the print control data in the markup language to a control command in a command language of the print unit, and prints based on the control command; and rendering software objects by a CPU, the software objects being the reader interface and the communication unit in the printer.

7. The print control method described in claim 6, wherein: the terminal has a display unit that displays, and the print control method further comprises:

receiving the product information that was acquired by the control unit of the management server; and displaying the product information on the display unit.

8. The print control method described in claim 6, wherein: the asynchronous duplex communication is WebSocket communication.

9. The print control method described in claim 6, further comprising:

the management server receiving the print command generated by the terminal;

the management server transmitting the print command to the print control server; and the print control server having a print control unit that generates print control data based on the received print command.

10. The print control method described in claim 9, further comprising:

the print control server transmitting the print control data to the printer; and the printer printing based on the print control data.

11. A print control system comprising:

one or more printer that print;

a reader interface that receives information in a specific format transmitted from a barcode reader, the information including a product code according to a barcode from a product or a product packaging that is optically read by the barcode reader;

a communication unit that establishes a logical communication path and pushes the information through asynchronous duplex communication;

a printer control server that receives the information transmitted from the communication unit through the logical communication path; and a management server that receives the information transmitted by the print control server, and transmits the information to a terminal, the management server being configured to send information to the one or more of the printers and command the one or more printers to print, wherein the one or more printer receives a print command data from the terminal, said print command data being based on the information, wherein the printer control server receives the print command data through the management server, generates print control data in a markup language format from the print command data, and pushes the print control data in the markup language to the one or more printers through the logical communication path without a request from the one or more printers as a client;

the one or more printers receive the print control data in the markup language from the print control server, convert the print control data in the markup language to a control command in a command language of the one or more printers, and print based on the control command; and the reader interface and the communication unit in the printers are software objects being rendered by a CPU.

* * * * *